3,004,960
FLUOROCYCLOBUTENYL ACETYLENES AND HOMOPOLYMERS THEREOF

Carleton T. Handy, Wilmington, and Robert M. Joyce, Hockessin, Del., assignors to E. I. du Pont de Nemours and Company, Wilmington, Del., a corporation of Delaware
No Drawing. Filed Dec. 9, 1957, Ser. No. 701,315
11 Claims. (Cl. 260—89.7)

This invention relates to a new class of fluorine-containing organic compounds. More particularly, it relates to new cyclic fluorine-containing organic compounds and to a method of preparing them.

Fluorine-containing organic compounds have become important industrially in a broad range of applications, such as plastics and films, where exceptional thermal stability or resistance to chemical attack is desired. Previous investigations in the field of fluorine-containing organic compounds have included compounds which contain a fluorinated cyclobutane group bonded to acetylene or a fluorinated cyclobutene group bonded to ethylene. In these compounds any multiply bonded carbons are bonded only to carbon or hydrogen. They are described as stable and as non-polymerizable or, at best, as polymerizable only under conditions which require the presence of strong polymerization catalysts such as inorganic persulfates or azonitriles. These prior art compounds are generally not adaptable, either because of physical properties or sluggish polymerization rates, to formation of hard films by simple procedures.

We have now found a new class of fluorine-containing organic compounds that are readily converted into hard, transparent films simply by heating in air in the presence of a metal drier. These novel compounds are symmetrically substituted acetylenes in which each of the triply bonded carbons is bonded to a cyclobutene ring through one of the nuclear doubly bonded carbons thereof, the second of said nuclear doubly bonded carbons being singly bonded, on the one hand, to an element of atomic number 7 through 9 (that is, nitrogen, oxygen or fluorine) and, on the other hand, to a nuclear carbon, which carbon is bonded to two fluorine atoms and to the remaining nuclear carbon, which carbon is unsubstituted. The compounds are further described as bis(3,3-difluorocyclobutenyl)acetylenes wherein the nuclear carbon in the 2-position in each cyclobutenyl ring is bonded to fluorine, a hydrocarbyloxy group or a di(hydrocarbyl)-amino group.

The compounds of this invention have the following structure:

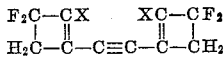

in which the X's are the same or different and are members of the class consisting of fluorine, OR and NR′$_2$ groups wherein R and R′ are hydrocarbyl radicals. The above structural formula shows that (1) the compounds of the invention have six hydrogen-free carbon atoms which are joined by three conjugated multiple bonds, (2) each carbon in the 2-position in the cyclobutene rings is free of hydrogen, and (3) there are at least two and no more than three fluorine atoms on each cyclobutene ring.

In this broad class of new compounds a preferred group consists of compounds wherein X is OR or NR′$_2$ in which R and R′ are hydrocarbyl groups of not more than 12 carbons and in which at least one of the R′ substituents is aliphatic or cycloaliphatic in character. These compounds are preferred because of stability and ease of preparation. Especially preferred compounds are those in which the R′ groups are aliphatic or cycloaliphatic hydrocarbyl groups of not more than 12 carbons. The R′ groups can be alike or different.

The compounds of the present invention are generally liquids or low-melting solids whose colors range from colorless to pale red. They can be distilled under reduced pressure and are stable to storage under ordinary atmospheric conditions. They are generally insoluble in water but are soluble in conventional organic solvents such as, for example, methanol, ethanol, acetone, diethyl ether and benzene. They are sparingly soluble in hydrocarbons, for example, petroleum ether or ligroin. The compounds polymerize readily when heated in air in the presence of a metal drier to form hard films which are insoluble in conventional organic solvents. Such films are useful as protective coatings.

The compounds of the invention are prepared by reacting a bis(2-halo-2,3,3-trifluorocyclobutyl)acetylene, in which the halogen in the 2-position is chlorine, bromine or fluorine, with a base which forms a salt with hydrogen fluoride. A preferred group of bases for use in the process of this invention comprises alkali metal hydroxides, alcoholates and phenolates and organic hydrocarbylamines which can form salts with hydrogen fluoride and in which the nitrogen is bonded to at most one hydrogen, that is, secondary and tertiary amines. The operability of amines can readily be determined by dissolving the amine in an unreactive organic solvent, for example, either benzene or cyclohexane, and passing hydrogen fluoride through the solution. The formation of a precipitate indicates that the amine forms a salt with hydrogen fluoride.

The initial fluorine-containing reactant, bis(2-halo-2,3,3-trifluorocyclobutyl)acetylene, can be prepared by the procedure described in U.S. 2,462,345 from polyfluoroolefins and divinylacetylene. The customary precautions in handling acetylenic compounds should be observed in this reaction. For convenience, the bis(2-halo-2,3,3-trifluorocyclobutyl)acetylenes will be referred to hereinafter as the acetylenic reactants. As stated earlier, compounds which contain fluorine, chlorine or bromine in each of the 2-positions are operable in the process of this invention. Because of their availability, compounds with fluorine or chlorine in the 2-positions are preferred.

The other reactant is, as already indicated, a basic reagent. The basic reactants operable in our process are available commercially or can be prepared by conventional and well-known methods. More will be said about these bases in the paragraphs which follow.

The substituent which is bonded to each carbon in the 2-position in the final product is determined by the basic reactant employed. If it is desired to obtain bis(2,3,3-trifluorocyclobutenyl)acetylene, the basic reactant which is employed will be an alkali metal hydroxide or a tri-(lower alkyl) substituted amine, that is, a tertiary amine in which the nitrogen is bonded to short-chain alkyl groups. These bases are dissolved in water and the reaction is, therefore, conveniently conducted in aqueous solution. Examples of operable bases are sodium hydroxide, lithium hydroxide, calcium hydroxide, tripropylamine, triisobutylamine and trioctylamine.

To obtain a compound with a hydrocarbyloxy group in each 2-position, the base employed is (1) a solution of an alkali metal hydroxide in an alcohol or in phenol, or (2) an alkali metal alcoholate or (3) an alkali metal phenolate. The alcohol or phenol which is employed provides the hydrocarbyloxy substituent in the final product. Illustrative of the alcohols and phenols which can be used are isobutanol, dodecanol, cyclohexanol, methyl cyclohexanol, phenol itself, β-naphthol and the cresols, ortha, meta, and para. The most convenient method of conducting the reaction is to use the alcohol in excess whereby it serves as a solvent. However, inert solvents can be used, if desired, to facilitate the reaction. Examples of such solvents are benzene, cyclohexane and diethyl ether.

Compounds which have a di(hydrocarbyl)amino substituent in each 2-position are obtained by employing a di(hydrocarbyl)amine as the basic reactant. The reaction is preferably conducted in solution in a suitable inert solvent, such as, for instance, benzene, toluene, octane and cyclohexane. The dihydrocarbylamine which is employed will have the structure of the substituent which is desired in each 2-position of the final product.

The quantities in which the reactants are used are not critical but, for good yields of product, it is desirable to use the base in quantity at least sufficient to react with all of the hydrogen halide which is removed in the reaction and to supply, if necessary, the substituent in each 2-position in the final product.

When the substituent in each 2-position in the final product is fluorine, a minimum of 2 moles of base to 1 mole of acetylene reactant is desirable although if less base is used some of the desired product will still be obtained. If the substituent in each 2-position in the final product is hydrocarbyloxy or di(hydrocarbyl)-amino, a minimum of 6 moles of base to 1 mole of acetylenic reactant is preferred. Higher molar ratios of base to acetylenic reactant can be employed, and preferably are, to insure complete reaction. For example, the molar ratio of base to acetylenic reactant can be as high as 15 to 1 or higher without affecting the reaction adversely.

The reaction is conducted by conventional chemical methods and can be accomplished at normal atmospheric pressure. The reaction vessel can be made of any suitable corrosion-resistant material, for example, glass, stainless steel, platinum, and the like, and is preferably equipped with a reflux condenser and a means for mechanically stirring the contents of the vessel. It is desirable also that means for heating and cooling the reaction vessel be provided. The components can be mixed directly and slowly heated to boiling. Alternatively, one component can be added slowly to the others to control the rate of the reaction. In the latter procedure the acetylenic reactant is generally added to the base.

The reaction between the bis(2-halo-2,3,3-trifluorocyclobutyl)acetylene and base may be exothermic initially but usually requires heating in the final stages to bring it to completion. The maximum temperature of heating will be controlled by the boiling point of the solvent but generally a temperature of about 30° C. to about 200° C. will be sufficient. The reaction ordinarily proceeds rapidly and, in most cases, will be completed in a period of one hour to five hours. However, these times are not critical and shorter or longer periods can be used.

A typical method of preparing the initial acetylenic reactants is illustrated as follows:

a. A heavy-walled glass tube, of the type used for pressure reactions, is charged with about 2 parts of divinylacetylene and 8 parts of tetrafluoroethylene. The tube is sealed and heated to 200° C. for 8 hrs. with suitable protective shielding. The liquid reaction product is separated from a small quantity of solid material and treated with petroleum ether. The soluble fraction is concentrated and distilled under reduced pressure through an efficient fractionating column to obtain 3.63 parts of bis(2,2,3,3-tetrafluorocyclobutyl)acetylene which boils at 74–79° C./14 mm.; M.P. 19° C.; $n_D^{25}$, 1.3743.

Analysis.—Calc'd. for $C_{10}H_6F_8$: C, 43.17; H, 2.16; F, 54.68, M. W., 278. Found: C, 43.35; H, 2.44; F, 55.63; M. W., 274.

b. The above procedure is repeated, using about 2 parts of divinylacetylene and 9.8 parts of chlorotrifluoroethylene. The mixture is heated for about 8 hours at 150° C. There is isolated from the reaction product 3.78 parts of bis(2-chloro-2,3,3-trifluorocyclobutyl)-acetylene which boils at 102–103° C./10 mm.; $n_D^{25}$, 1.4252.

Analysis.—Calc'd. for $C_{10}H_6F_6Cl_2$: C, 38.75; H, 1.92; Cl, 22.80. Found: C, 39.19; H, 2.50; Cl, 22.23.

The following examples, in which parts are by weight, illustrate specific typical embodiments of the invention.

EXAMPLE I

Part A

A solution composed of 6.2 parts of bis(2-chloro-2,3,3-trifluorocyclobutyl)acetylene, 10 parts of triethylamine and about 40 parts of benzene is placed in a glass reaction vessel and heated to refluxing for 5 hours. A precipitate forms during the reaction and a further quantity separates on cooling. The solid is removed by filtration and the filtrate washed with water and dried. Benzene is removed from the filtrate by evaporation, leaving 4.2 parts of a dark non-viscous oil. The oil is distilled under reduced pressure through an efficient fractionating column to yield 0.8 part of bis(2,3,3-trifluorocyclobutenyl)-acetylene, B.P., 45° C./6 mm.; $n_D^{25}$, 1.4537. The identity of the product is confirmed by its nuclear magnetic resonance spectrum and by elementary analysis.

Analysis.—Calc'd for $C_{10}H_4F_6$: C, 50.42; H, 1.68. Found: C, 50.52; H, 1.61.

Part B

Using the procedure of Part A of this example, a solution of 15.6 parts of bis(2-chloro-2,3,3-trifluorocyclobutyl)acetylene, 25 parts of triethylamine and about 80 parts of benzene is heated to boiling for a period of 1.5 hours. There is obtained from the reaction mass 12 parts of crude product which on fractional distillation yields 5.5 parts of bis(2,3,3-trifluorocyclobutenyl)-acetylene.

Part C

An additional quantity of bis(2,3,3-trifluorocyclobutenyl)acetylene is obtained by reacting 5.56 parts of bis-(2,2,3,3-tetrafluorocyclobutyl)acetylene, 5.6 parts of aqueous 0.10 molar potassium hydroxide and 50 parts of water containing a trace of a commercial wetting agent for 2 hours at reflux temperature. The analytical data on the product are: F (calc'd.), 47.90%; F (found), 49.31%.

The foregoing example illustrates the class of our new compounds in which the substituent in each of the 2-positions of the cyclobutenyl rings is fluorine.

EXAMPLE II

Part A

A mixture of 7.4 parts of potassium hydroxide and about 40 parts of methanol is prepared to which 9.3 parts of bis(2-chloro-2,3,3-trifluorocyclobutyl)acetylene is added slowly with agitation. When the reaction, which is exothermic, has subsided heat is supplied to maintain the reaction mass at reflux temperature for 2 hours. A large quantity of yellow solid is formed. After the reaction mass is cooled, the solid is removed by filtration and washed with water.

Crystallization of the yellow solid from 90% methanol-10% water solution yields 6.5 parts of bis(2-methoxy-3,3-difluorocyclobutenyl)acetylene. Recrystallization of the product produces colorless prisms which melt at 69° C. The structure of the product is confirmed by the ultraviolet absorption spectrum, the nuclear magnetic resonance spectrum and by elementary analysis.

Analysis.—Calc'd. for $C_{12}H_{10}F_4O_2$: C, 54.96; H, 3.82; F, 29.01. Found: C, 56.04; H, 3.78; F, 28.32.

Part B

The experiment is repeated using 8.4 parts of bis(2,2,3,3-tetrafluorocyclobutenyl)acetylene and 74 parts of potassium hydroxide in about 40 parts of methanol. There is obtained 6.5 parts of bis(2-methoxy-3,3-difluorocyclobutenyl)acetylene, melting at 67° C.

EXAMPLE III

Part A

A solution of 2.6 parts of potassium hydroxide in about 12 parts of absolute ethanol is prepared to which 2.42 parts of bis(2-chloro-2,3,3-trifluorocyclobutyl)acetylene is added slowly with stirring. In the initial stages, the reaction is rapid and exothermic. After the vigor of the reaction has subsided, the reaction mixture is heated to boiling for one hour. Addition of water to the cooled reaction mass causes the separation of a dark oil which is dissolved in benzene. The benzene solution is washed with water, dried and distilled through an efficient fractionating column. There is obtained 1.15 parts of bis-(2-ethoxy-3,3-difluorocyclobutenyl)acetylene which boils at 111–119° C./5 mm., principally at 118–119° C./5 mm. Redistillation of the product gives a colorless oil ($n_D^{25}$, 1.4938) which crystallizes as colorless plates from a solution in petroleum ether. The identity of the compound is confirmed by infrared and nuclear magnetic resonance spectra and by elementary analysis.

*Analysis.*—Calc'd. for $C_{14}H_4F_4O_2$: C, 57.93; H, 4.83; F, 26.20. Found: C, 58.41; H, 5.02; F, 26.10.

Part B

The experiment is repeated using 9.3 parts of bis(2-chloro-2,3,3-trifluorocyclobutyl)acetylene, 9.9 parts of potassium hydroxide and about 40 parts of ethanol. There is obtained 4.99 parts of bis(2-ethoxy-3,3-difluorocyclobutenyl)acetylene, boiling at 109° C./2 mm.

EXAMPLE IV

A total of 14 parts of bis(2,2,3,3-tetrafluorocyclobutyl)-acetylene is added dropwise and with agitation to a moderately warm solution of 8.5 parts of potassium hydroxide in about 80 parts of isopropanol. After the initial reaction, which is exothermic, has subsided, the solution is warmed to refluxing for 50 minutes and then allowed to stand for three hours. The reaction mixture is diluted with 300 parts of water. The heavy layer which separates is collected and then dissolved in ether. The ether solution is washed with water and dried. After removal of the ether, the residue is distilled under reduced pressure. There is obtained in 10% yield bis(2-isopropoxy-3,3-difluorocyclobutenyl)acetylene, which boils at 98° C./0.3 mm.; $n_D^{25}$, 1.4847. The identity of the product is confirmed by the nuclear magnetic resonance spectrum and by elementary analysis.

*Analysis.*—Calc'd. for $C_{16}H_{18}F_4O_2$: C, 60.40; H, 5.66. Found: C, 59.07; H, 5.68.

There is also obtained in 2% yield the compound (2-isopropoxy-3,3-difluorocyclobutenyl) (2',3',3'-trifluorocyclobutenyl)acetylene which boils at 93° C./2 mm.; $n_D^{25}$ 1.4565. This compound has the following structure:

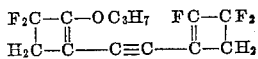

Its identity is confirmed by its nuclear magnetic resonance spectrum and by elemental analysis.

*Analysis.*—Calc'd. for $C_{13}H_{11}F_5$: F, 36.22. Found: F, 34.61.

Examples II, III and IV have illustrated compounds of the invention in which the substituent in each of the 2-positions is a saturated aliphatic hydrocarbyloxy group. Other compounds illustrative of our novel compounds containing such substituents in the 2-position of the cyclobutenyl rings are bis(2-octyloxy-3,3-difluorocyclobutenyl)acetylene, bis(2-dodecyloxy-3,3-difluorocyclobutenyl)acetylene and bis(2-cyclohexyloxy-3,3-difluorocyclobutenyl)acetylene. These compounds are readily prepared from appropriate reactants in accordance with the above-described method.

Example IV also illustrates a compound in which the substituents in the 2-positions are different. This type of compound is discussed in a subsequent paragraph.

EXAMPLE V

A solution of 5.6 parts of potassium hydroxide is prepared in about 40 parts of allyl alcohol. The solution is warmed mildly and 5.56 parts of bis(2,2,3,3-tetrafluorocyclobutyl)acetylene is added to it dropwise and with agitation. After the initial reaction, which is exothermic, has subsided, the solution is heated to refluxing for one hour.

After the reaction mixture is cooled, it is washed with salt water and filtered to remove a small quantity (0.9 part) of infusible solid. The filtrate is dissolved in ether, the ether solution washed with water and dried. The ether is removed by distillation and the liquid residue is distilled through an efficient fractionating column under reduced pressure to obtain 0.35 part of bis(2-allyloxy-3,3-difluorocyclobutenyl)acetylene which is a viscous colorless oil and boils at 88° C./0.3 mm., $n_D^{25}$, 1.4469. The identity of the product is confirmed by the nuclear magnetic resonance spectrum and by elementary analysis.

*Analysis.*—Calc'd. for $C_{16}H_{14}O_2F_2$: C, 61.20; H, 4.50. Found: C, 61.06; H, 4.73.

As has been seen, Example V is illustrative of the practice of this invention in which the substituent in the 2-position of each of the cyclobutenyl rings is an aliphatically unsaturated hydrocarbyloxy group. Other compounds illustrative of the novel compounds of the invention containing such substituents in the 2-position are bis-(2-methallyloxy - 3,3 - difluorocyclobutenyl)acetylene and bis(2 - crotonyloxy - 3,3 - difluorocyclobutenyl)acetylene. Such compounds are readily prepared from appropriate reactants using the method of the foregoing example.

EXAMPLE VI

A solution of 5.83 parts of bis(2,2,3,3-tetrafluorocyclobutyl)acetylene in about 20 parts of dioxane is added dropwise to a warm solution of 3.4 parts of potassium hydroxide in 18.8 parts of anhydrous phenol. After the addition is completed, the resulting cloudy suspension is heated to boiling for two hours. The dioxane is then removed by distillation under reduced pressure, the liquid is filtered to separate a solid portion, and the solid is washed thoroughly with ether. The ether washings and the liquid filtrate are combined, washed with water, dried and the ether is removed by distillation. There is obtained 22 parts of an amber oil from which white crystals separate on chilling. These are removed by filtration, washed with cold 50% aqueous methanol and dried. There is obtained 3.7 parts of bis(2-phenoxy-3,3-difluorocyclobutenyl)-acetylene which crystallizes as white needles from methanol and melts at 104.5–105° C.

*Analysis.*—Calc'd. for $C_{22}H_{14}F_4O_2$: C, 68.39; H, 3.64. Found: C, 68.36; H, 3.85.

Example VI illustrates the compounds of the invention in which the substituent in the 2-position is an aryloxy group. Other illustrative examples of our novel compounds wherein an aryloxy group is the substituent are bis[2-(β-naphthyloxy)-3,3-difluorocyclobutenyl]acetylene and bis[2-(p-tolyloxy)-3,3-difluorocyclobutenyl]acetylene.

EXAMPLE VII

Part A

A solution of 6.2 parts of bis(2-chloro-2,3,3-trifluorocyclobutyl)acetylene and 14.6 parts of diethylamine in about 40 parts of benzene is heated under reflux for four hours. Diethylammonium halides, which precipitate, are separated by filtration and the filters is washed with water. The benzene is removed by distillation and the liquid residue is distilled twice under reduced pressure through a short fractionating column. There is obtained 4.0 parts of an amber colored oil which boils at 132–138° C./0.2 mm. The oil is purified further by a chromatographic method using an alumina column and petroleum ether as a solvent. There is obtained 2.88 parts of bis(2-diethylamino-3,3-difluorocyclobutenyl)acetylene, $n_D{}^{25}$, 1.5568. The structure of the compound is confirmed by its nuclear magnetic resonance spectrum and by elementary analysis.

Analysis.—Calc'd. for $C_{16}H_{24}N_2F_4$: N, 8.15; F, 22.08. Found: N, 8.41; F, 21.53.

Part B

A warm solution of 36 parts of diethylamine and 50 parts of water is added dropwise to 10.4 parts of bis(2-chloro - 2,3,3 - trifluorocyclobutyl)acetylene. After the initial reaction, which is exothermic, has subsided, the reaction mass is heated to refluxing for three hours. The organic layer is dissolved in about 71 parts of ethyl ether, washed with water, dried and the ether removed by evaporation. The liquid residue is purified by a chromatographic method using methylene chloride as a solvent and an alumina column. There is obtained 10.6 parts of bis(2-diethylamino-3,3-difluorocyclobutenyl)acetylene, an amber-colored oil which boils at 120° C./0.12 mm.; $n_D{}^{25}$, 1.5628. Analysis: F. (calc'd.), 22.08; F. (found, 21.56).

In addition to the compound of Example VII, there can be named as illustrative of the compounds of the present invention in which the substituent in the 2-position is a dihydrocarbylamino group bis[2-(N-methylanilino)cyclobutenyl]acetylene, bis(2-dicyclohexylaminocyclobutenyl)-acetylene, bis[2-(N - propyl - N - cyclohexylamino)cyclobutenyl]acetylene, bis(2-diallylaminocyclobutenyl)acetylene and bis(2-didodecylaminocyclobutenyl)acetylene.

In the compounds as principally illustrated, the substituents in the 2-positions on the cyclobutenyl rings are alike. It is possible as demonstrated in Example IV to obtain compounds in which the substituents in the 2-positions are different. This type of compound is most readily obtained by employing less than the theoretical amount of base which is needed for complete removal and neutralization of the hydrogen halide. Examples of compounds in which the substituents in the 2-positions are different are (2-cyclohexyloxy-3,3-difluorocyclobutenyl) (2',3',3'-trifluorocyclobutenyl)acetylene and (2-dipropylamino-3,3-difluorocyclobutenyl) (2',3',3' - trifluorocyclobutenyl)-acetylene.

The compounds of this invention are readily polymerized by heating in air and are generally useful as agents for forming protective films and coatings. Their utility in this respect is demonstrated in the following examples.

EXAMPLE A

About 5 parts of the product of Example III-B, that is, bis(2-ethoxy-3,3-difluorocyclobutenyl)acetylene, is mixed with approximately 0.10 part of cobalt naphthenate and spread on a glass surface. After standing in air overnight, it forms a tacky film which, when baked at 120° C. for 30 minutes, becomes hard and tack-free.

EXAMPLE B

The product of Example IV, that is, bis(2-isopropoxy-3,3-difluorocyclobutenyl)acetylene, is treated as in Example A. A tacky film forms in air which, when baked at 150° C. for 30 minutes, becomes hard and insoluble in toluene.

EXAMPLE C

The product of Example VII-B, that is, bis(2-diethylamino-3,3-difluorocyclobutenyl)acetylene is treated as described in Example A. The film on glass is exposed to air at room temperature for 24 hours and then heated at 150° C. for two hours. There is obtained a hard transparent film which is insoluble in xylene.

The films obtained from the compound of the invention are hard, durable and resistant to attack by chemical agents. They adhere strongly to surfaces of glass, wood or metals such as copper, iron or various steels, serving as protective coatings for objects made of these and related materials.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A bis(2-hydrocarbyloxy-3,3-difluorocyclobutenyl)-acetylene, in which the double bond in the cyclobutenyl group is between the carbons in the 1- and 2-positions and in which the nuclear carbon in the 4-position in each cyclobutenyl ring is unsubstituted.

2. A bis[2-di(hydrocarbyl)-amino - 3,3 - difluorocyclobutenyl]acetylene, in which the double bond in the cyclobutenyl group is between the carbons in the 1- and 2-positions and in which the nuclear carbon in the 4-position in each cyclobutenyl ring is unsubstituted.

3. A compound of claim 1 having the formula

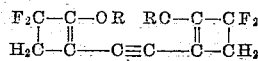

wherein R is a hydrocarbyl group of from 1 to 12 carbon atoms.

4. A compound of claim 2 having the formula

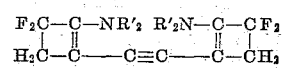

wherein R's are hydrocarbyl groups and at least one R' is a member of the class consisting of aliphatic and cycloaliphatic hydrocarbyl groups.

5. A compound of claim 2 having the formula

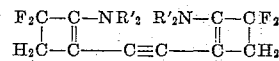

wherein R's represent members of the class consisting of aliphatic and cycloaliphatic hydrocarbyl groups of not more than 12 carbon atoms.

6. Process for preparing a bis(2-hydrocarbyloxy-3,3-difluorocyclobutenyl)acetylene in which the double bond in the cyclobutenyl group is between the carbons in the 1- and 2-positions and in which the nuclear carbon in the 4-position in each cyclobutenyl ring is unsubstituted which comprises reacting a bis(2-halo-2,3,3-trifluorocyclobutyl)-acetylene, wherein said halo radical is selected from the group consisting of chlorine, bromine and fluorine, with a base of the group consisting of (1) solutions of an alkali metal hydroxide in an alcohol, (2) solutions of an alkali metal hydroxide in a phenol, (3) alkali metal alcoholates and (4) alkali metal phenolates.

7. Process for preparing a bis[2-di(hydrocarbyl)-amino-3,3-trifluorocyclobutenyl]acetylene in which the double bond in the cyclobutenyl group is between the carbons in the 1- and 2-positions and in which the nuclear carbon in the 4-position in each cyclobutenyl ring is unsubstituted which comprises reacting a bis(2-halo-2,3,3-trifluorocyclobutyl)acetylene, wherein said halo group is a member of the class consisting of chlorine, bromine and fluorine, with a di(hydrocarbyl)amine.

8. A homopolymer of the monomeric compound defined in claim 1.

9. A homopolymer of the monomeric compound defined in claim 2.

10. Bis(3,3 - difluorocyclobutenyl)acetylenes wherein the double bond in each cyclobutenyl group is between the carbons in the 1- and 2-positions and wherein the nuclear carbon in the 2-position in each cyclobutenyl ring is bonded to a member of the class consisting of fluorine, hydrocarbyloxy and di(hydrocarbyl)amino groups and the nuclear carbon in the 4-position in each cyclobutenyl ring is unsubstituted.

11. Bis(2,3,3-trifluorocyclobutenyl)acetylene.

References Cited in the file of this patent

UNITED STATES PATENTS

| | | |
|---|---|---|
| 2,462,345 | Barrick | Feb. 22, 1949 |
| 2,462,347 | Barrick | Feb. 22, 1949 |

OTHER REFERENCES

Chem. ab. (1945), vol. 39, No. 24, page 5963.